United States Patent [19]

Kubis

[11] Patent Number: 4,906,151
[45] Date of Patent: Mar. 6, 1990

[54] THREADED INSERT HAVING A SMALL EXTERNAL DIAMETER FOR SCREWS HAVING A TRAPEZOIDAL THREAD

[75] Inventor: Heribert Kubis, Nürnberg, Fed. Rep. of Germany

[73] Assignee: MAN Nutzfahrzeuge GmbH, München, Fed. Rep. of Germany

[21] Appl. No.: 321,951

[22] Filed: Mar. 10, 1989

[30] Foreign Application Priority Data

Mar. 11, 1988 [DE] Fed. Rep. of Germany ....... 3808125

[51] Int. Cl.$^4$ ............................................. F16B 37/12
[52] U.S. Cl. .................................. 411/178; 411/411; 411/427
[58] Field of Search ............... 411/277, 178, 436, 177, 411/103, 423, 411, 395, 937, 937.1, 427

[56] References Cited

U.S. PATENT DOCUMENTS 3,081,808 3/1963 Rosan et al. ................ 411/937.1 X Primary Examiner—Rodney M. Lindsey
Attorney, Agent, or Firm—Robert W. Becker

[57] ABSTRACT

A sturdy threaded insert for screws having a trapezoidal thread. To keep the external diameter of this threaded insert small (due to the limited space often available), and to ensure that the female thread produces a perfect seal (if the threaded insert is closed in construction), the threaded insert is constructed as follows: The basic shape of the threaded insert represents a circumscribed quadrilateral, which is a rhombus if the trapezoidal thread is symmetrical and is a parallelogram if the trapezoidal thread is asymmetrical. The superimposed quadrilateral profiles are connected to one another by a web having a minimum wall thickness of about 30% of the useful profile depth of the screw thread, and in any case is at least 0.3 mm. In addition, the threaded flank projections of the annular surfaces are equal on the workpiece side and on the screw side.

6 Claims, 2 Drawing Sheets

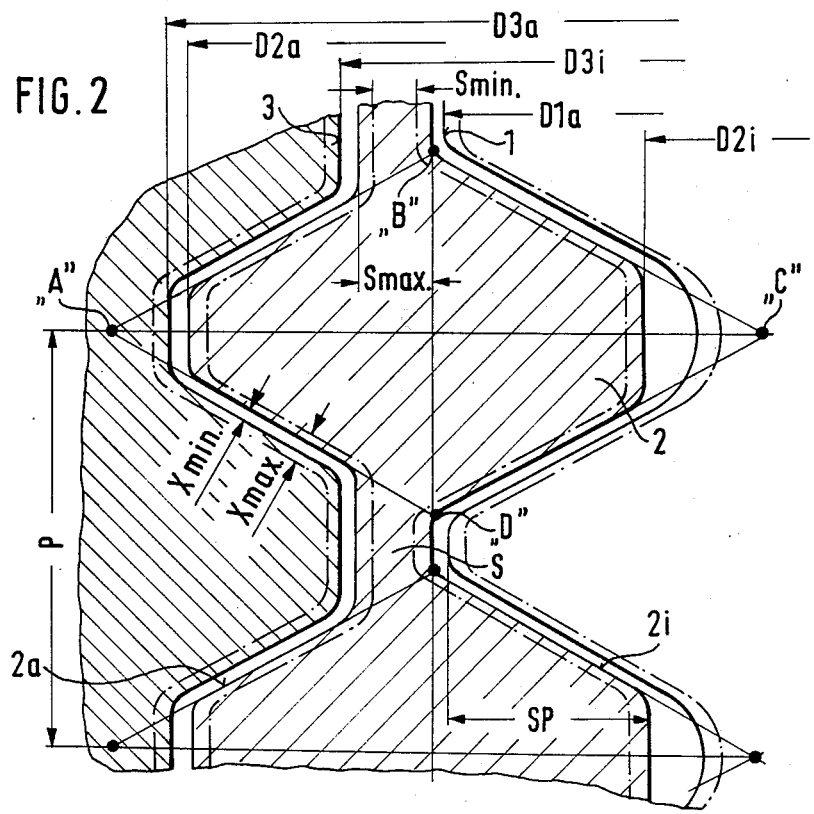
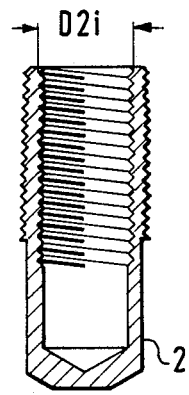
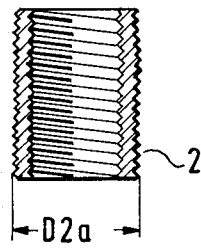
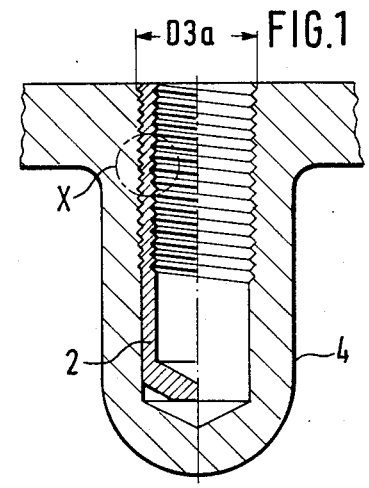
FIG. 2
FIG. 1A  FIG. 1b  FIG. 1

4,906,151

THREADED INSERT HAVING A SMALL EXTERNAL DIAMETER FOR SCREWS HAVING A TRAPEZOIDAL THREAD

BACKGROUND OF THE INVENTION

The present invention relates to a strong threaded bushing or insert of open or closed construction with symmetrical or asymmetrical trapezoidal external thread and internal thread, which insert is screwed via its external thread into a, preferably metallic, workpiece that has a corresponding internal thread (female thread), with the internal thread of the threaded insert serving to receive a high-strength screw that has a corresponding opposing or cooperating thread.

In screw connections having a female or internal thread directly in the material of one of the mating parts that are to be screwed together, threaded inserts are often used for the following reasons:

(a) the strength of the basic material is not sufficiently durable for the female thread, with this frequently being the case when using high-strength screws;

(b) the thread has to have special resistance to wear and great reserves with respect to durability since the screw connection is often repeatedly loosened and retightened, as a result of which incorrect, in particular impermissibly great, tightening of the screw has to be allowed for; and (c) the female threads of particularly large, expensive components have been produced defectively or do not produce a seal after final machining in the case of parts that have to be tight to liquids or gases. In these cases, expensive rejects or scrap can be avoided by introducing a larger female thread and installing a suitable threaded insert without altering the screw itself.

Threaded inserts of sturdy, suitably thick-walled construction or, if a seal with the female thread is unimportant, trapezoidal wire profile inserts, for example "Heli-Coil" inserts, have proven suitable for the above-mentioned cases. Unfortunately, inserts of this type cannot be used if:

(1) the external diameter of the threaded insert has to be small due to the restricted space or to avoid impermissible weakening of load-bearing structures, while at the same time providing a sealing relative to the female thread; and/or (2) wire profile inserts having small external diameters are not available, for example in an asymmetrical design, due to the use of special threads or if the female thread has to produce a seal.

It is therefore an object of the present invention to construct a threaded insert of the aforementioned general type in such a way that it has a small external diameter that is adapted to the restricted space and thus prevents impermissible weakening of load-bearing structures. At the same time, the insert should also be suitable for special threads (for example of asymmetrical design) and should simultaneously ensure that the female thread produces a perfect seal (in the case of a closed construction).

BRIEF DESCRIPTION OF THE DRAWINGS

These and other objects and advantages of the present invention will appear more clearly from the following specification in conjunction with the accompanying schematic drawings, in which:

FIG. 1 is a longitudinal section through one exemplary embodiment of an inventive threaded bushing or insert that is closed at the bottom and is screwed into a workpiece;

FIG. 1A is a cross-sectional view of just the closed threaded bushing of FIG. 1;

FIG. 1B is a cross-sectional view of another exemplary embodiment of an inventive threaded bushing or insert of "open" construction;

FIG. 2 shows an enlarged partial detail of the encircled X portion of FIG. 1, with the type of thread being a symmetrical trapezoidal thread.

SUMMARY OF THE INVENTION

Figure 3:
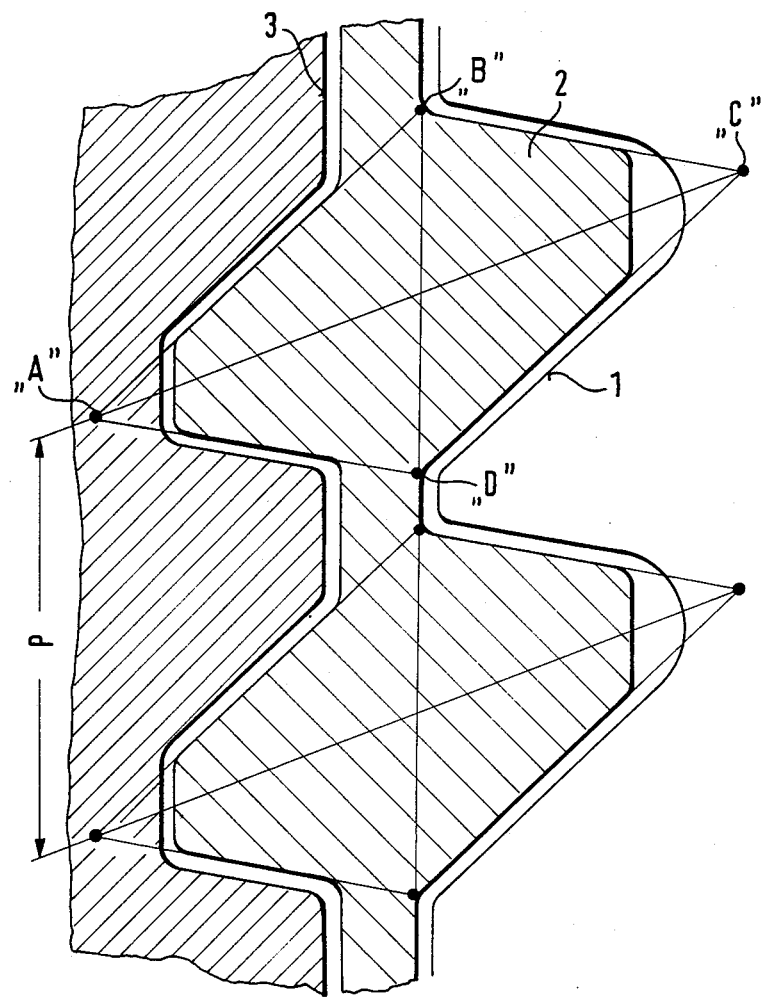
FIG. 3 shows an enlarged partial detail, as in FIG. 2, but with an asymmetrical trapezoidal thread as the type of thread.

The threaded insert of the present invention is characterized primarily in that the internal thread (thread on the screw side) and the external thread (thread on the workpiece side) of the threaded insert are produced, so as to run in the same direction as or parallel to one another, in such a way that the basic shape of the threaded insert is formed by a circumscribed quadrilateral having corner points A-B-C-D, with the quadrilateral being a rhombus when the trapezoidal thread is symmetrical, and being a parallelogram when the trapezoidal thread is asymmetrical; in that the superimposed quadrilateral profiles are connected to one another by a web or rib, the axis of which is parallel to the axis of the threaded insert, and which has a minimum wall thickness of about 30% of the useful profile depth of the thread of the screw, but in any case at least 0.3 mm; and in that the external diameter of the threaded insert is such that the annular areas formed by the projections of the used threaded flanks between the diameters of the external thread of the threaded insert and the internal thread of the workpiece on the external periphery, and the diameters of the thread of the screw and the internal thread of the threaded insert on the internal periphery, have equal surface areas.

Due to the fact that the circumscribed basic shape of the threaded insert is in the form of a rhombus or a parallelogram, the threaded insert has a compact structure which, as with the proven wire profile inserts, allows a linear positive connection from the screw thread via the threaded insert to the female thread of the workpiece. Notches having impermissible peaks of stress of the type which would occur during axial displacement of the two threads (internal and external thread) of the threaded insert are thus avoided. The axially parallel web allows easy production of the threaded insert as a sturdy threaded bushing (for example by rotary machining), and at the same time produces a seal with the female thread when a closed threaded insert is used. Due to the dimensions specified, the annular cross-section of the web is significantly less than that of the rhombus or parallelogram profile, as a result of which the web can adapt itself elastically and plastically to small deformations of the loaded threaded insert without impermissible peaks of stress occurring. To obtain a minimum external diameter of the external thread of the threaded insert, and to allow equally high pressures to be applied to the flanks of the external and internal thread of the threaded insert, the external diameter of the threaded insert is designed such that the threaded flank projections of the ring or annular surfaces are equal on the workpiece side and on the screw side. This external diameter corresponds roughly to that of the wire profile inserts available (for the threaded region under consideration), with the advantage of a smaller external diameter than sturdy threaded bushings with internal and external threads that are not parallel to one another.

Further specific features of the present invention will be described in detail subsequently.

DESCRIPTION OF PREFERRED EMBODIMENTS

Referring now to the drawings in detail, FIG. 1 shows a threaded bushing 2 (closed at the bottom) that is screwed into a workpiece 4. The threaded bushing is shown by itself in FIG. 1A. FIG. 1B shows a threaded bushing of "open" construction. Whenever no additional seal is required for the female thread, it is advantageous to use threaded inserts of this "open" type because they are cheaper than closed threaded inserts.

The inventive features of the threaded insert 2 are shown in FIG. 2 which is an enlarged detailed view of the encircled portion X in FIG. 1. In this figure, the screw thread is designated by the reference numeral 1, and the female thread of the workpiece 4 by the reference numeral 3. A symmetrical trapezoidal thread is used as the type of thread.

The threaded insert 2 is provided with an internal thread 2$i$ (thread on the screw side) and an external thread 2$a$ (thread on the workpiece side), with the respective diameter of the internal thread being designated by D2$i$ and that of the external thread by D2$a$. Furthermore, the external diameter and the internal diameter of the female thread 3 in the workpiece 4 are designated by D3$a$ and D3$i$ respectively, and the external diameter of the screw thread 1 is designated by D1$a$. The clearances Xmin. and Xmax. required for the screwing-in process are determined by the tolerances of the screw thread 1, the threads of the threaded insert 2, and the workpiece thread 3, which correspond to conventional thread tolerances.

An important feature of the present invention is that the internal thread 2$i$ and the external thread 2$a$ of the threaded insert 2 are produced parallel or in the same direction relative to one another in such a way that the basic shape of the threaded insert represents a circumscribed quadrilateral (or a rhombus if the trapezoidal thread is symmetrical) having the corner points A-B-C-D. This load-bearing cross-sectional structure of the threaded insert allows an optimum flow of forces from the internal thread 2$i$ to the external thread 2$a$.

The superimposed rhombus profiles are connected to one another in the vertical direction by a web or rib S which, according to the invention, amounts to about 30% of the useful profile depth SP of the screw thread 1, but in any case is at least 0.3 mm. The annular cross-section of the web S is therefore much less than that of the rhombus profile. The web S can therefore be adapted to small deformations of the loaded threaded insert, thus avoiding impermissible stress points or peaks. The web S also produces the seal for the female thread 3 when a closed threaded insert 2 is used. The maximum web thickness is shown in FIG. 2 by Smax., and the minimum web thickness is shown by Smin.

Although the geometry of the internal thread 2$i$ is adapted to that of the screw thread 1, the external diameter D2$a$ of the threaded insert 2 is designed in such a way that the projections of the ring or annular surfaces on the workpiece side and on the screw side, i.e. the projections of the used threaded flanks between the diameters D2$a$ and D3$i$ on the external periphery, and D1$a$ and D2$i$ on the internal periphery, are equal, as follows:

$$\frac{(D2a)^2 \cdot \pi}{4} - \frac{(D3i)^2 \cdot \pi}{4} = \frac{(D1a)^2 \cdot \pi}{4} - \frac{(D2i)^2 \cdot \pi}{4}$$

With $D3i = D1a + 4 \cdot Xmin. + 2 \cdot Smax.$, and Xmin. being used for the range of the web S, the external diameter D2$a$ is therefore:

$$D2a = \sqrt{(D1a)^2 - (D2i)^2 + (D1a + 4\ Xmin. + 2\ Smax.)^2}$$

Equal pressures occur on the flanks of external and internal thread 2$a$ and 2$i$ due to the equal areas of the annular faces of the threaded flank projections. Due to the greater diameter of the external thread 2$a$, an equally great projection face of the thread 2$a$ is produced with a smaller radial dimension relative to the internal thread 2$i$ (web S is longer externally), and this produces a minimum external diameter D2$a$ of the external thread 2$a$.

For completeness it should be mentioned that the thread pitch P is also shown in FIG. 2.

FIG. 3 shows an asymmetrical trapezoidal thread, of the same pitch P, that has the same features as the symmetrical trapezoidal thread described with reference to FIG. 2. However, with this embodiment the circumscribed basic profile of the threaded insert 2 represents a parallelogram having the corner points A-B-C-D. Thus, the threaded insert having a small external diameter is also available for special threads, since wire profile inserts for such special threads are not commercially available.

Finally, it should be mentioned that free-machining or tempering steel having a breaking elongation of at least 8% is preferably used as the material for the threaded inserts described.

The threaded inserts are used, in particular, in the construction of engines and transmissions, especially for screw threads having a diameter of 12 to 22 mm and any desired pitch.

The present invention is, of course, in no way restricted to the specific disclosure of the specification and drawings, but also encompasses any modifications within the scope of the appended claims.

What I claim is:

1. In a strong threaded insert of open or closed construction with symmetrical or asymmetrical trapezoidal external thread, on an external periphery thereof, and internal thread, on an internal periphery thereof, which insert has an axis and is secured via said external thread into a workpiece that has a corresponding female or internal thread, with said internal thread of said threaded insert being adapted to receive a high-strength screw that has a corresponding cooperating thread with a useful profile depth, the improvement wherein:

said internal thread and said external thread of said threaded insert extend parallel to one another in such a way that said insert has repeated basic configurations formed in each case by a circumscribed quadrilateral;

superimposed ones of said quadrilateral profiles are connected to one another by a web that has an axis which is parallel to said axis of said threaded insert, and that has a minimum wall thickness of about 30% of said useful depth of said screw thread, with said minimum wall thickness in any case being equal to at least 0.3 mm; and said external thread of said insert has an external diameter that is such that annular areas formed by projections of the used threaded flanks between the diameters of said external thread of said insert and said internal thread of said workpiece on said external periphery of said insert, and between the diameters of said screw thread and said internal thread of said insert on said internal periphery thereof, have equal areas.

2. A threaded insert according to claim 1, in which said quadrilateral is a rhombus when said trapezoidal thread is symmetrical.

3. A threaded insert according to claim 1, in which said quadrilateral is a parallelogram when said trapezoidal thread is asymmetrical.

4. A threaded insert according to claim 1, in which the material of said insert is selected from the group consisting of free-machining and tempering steel having a breaking elongation of at least 8%.

5. A threaded insert according to claim 1, for use in engines and transmissions.

6. A threaded insert according to claim 5, for screw threads having a diameter of 12 to 22 mm and any desired pitch.

* * * * *